INVENTOR.
Raymond L. Kelleher
BY
Wells & St.John
Attys.

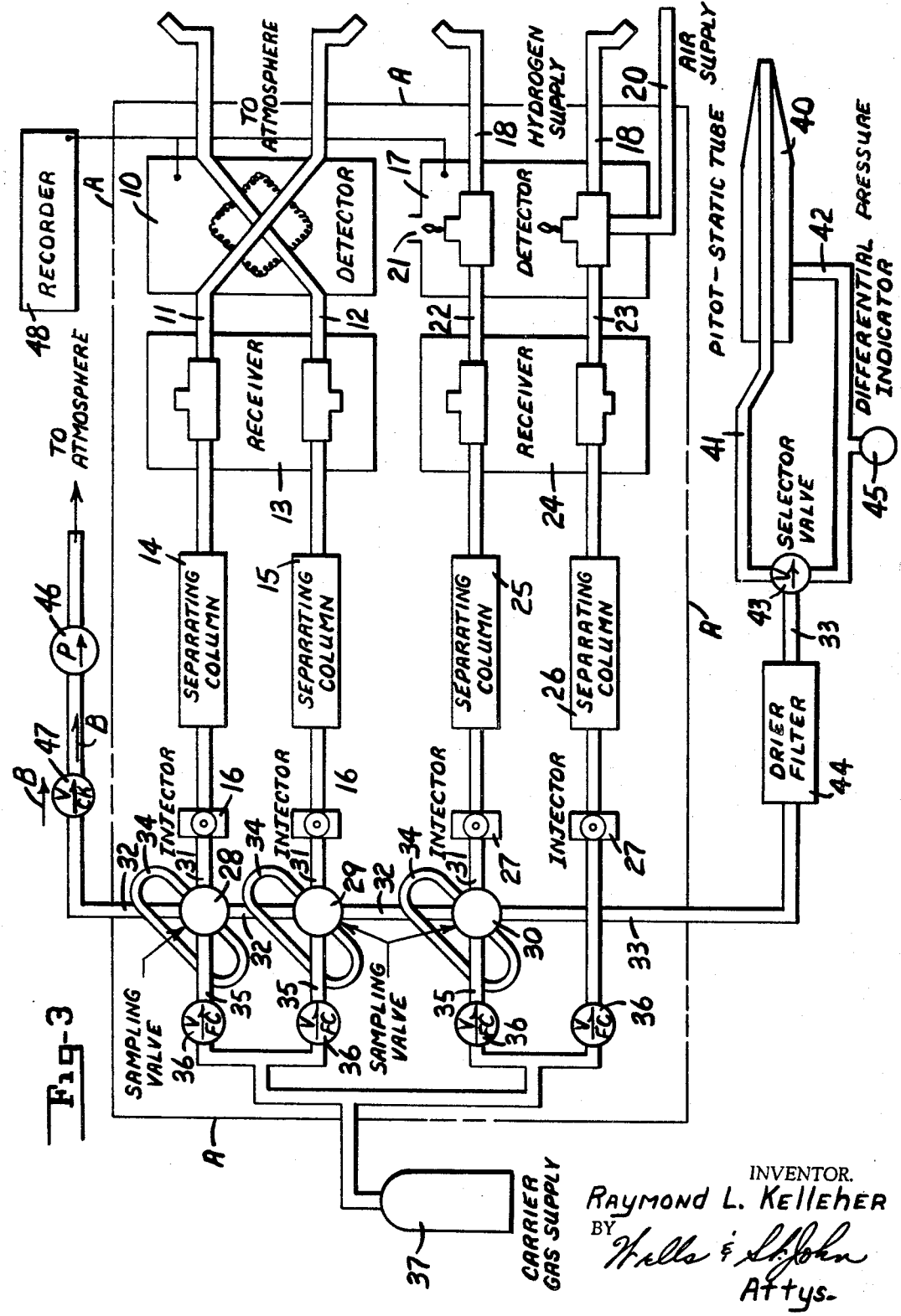

United States Patent Office

3,474,659
Patented Oct. 28, 1969

3,474,659
METHOD AND APPARATUS FOR ATMOSPHERIC SAMPLING
Raymond L. Kelleher, Spokane, Wash., assignor to The Corporation of Gonzaga University, Spokane, Wash., a corporation of Washington
Filed Dec. 13, 1967, Ser. No. 690,169
Int. Cl. G01n 31/08, 1/22, 31/00
U.S. Cl. 73—23.1
15 Claims

ABSTRACT OF THE DISCLOSURE

A method and apparatus wherein gas detection methods and devices are used for quantitative and qualitative analysis of outdoor atmospheric samples taken from a moving vehicle. The method includes the reception of an atmospheric sample volume at an uncontrolled pressure and subsequent equalization of the pressure of the sample volume with the static pressure of the atmospheric source prior to analysis. The apparatus utilizes a pitot-static tube in a dynamic relationship relative to the source and a selector valve that places the sample volume in alternate communication with the pitot connection and the static connection of the pitot-static tube. A differential pressure indicating gauge is utilized to indicate pressure equalization at the static connection.

Background of the invention

The disclosure relates to the utilization of gaseous analytical instruments for analysis of atmospheric samples in a moving vehicle. It is designed for mass testing of atmospheric samples in urban or rural areas subject to natural or man-made air pollution or contamination. To understand the sampling process, one must have a general grasp of the analytical apparatus utilized.

A first analysis tool described herein is commonly termed an Infrared Spectrophotometer. It includes a gas absorption cell, an infrared radiation source and an infrared detector. The cell provides reference spectra of compounds contained therein in the gaseous state, a fixed volume of gas being used as described herein. The absorption of infrared radiation is monitored to detect the presence and amount of desired compounds.

Adsorption chromatography, also described herein, is a known method for analyzing fluid samples (liquid or gas) by preferential adsorption and desorption. In conventional systems, a separating column containing appropriate adsorber is used to separate the various components of a fluid sample. The fluid sample, generally in the gaseous state, is introduced to the column as a slug of sample gas in a stream of carrier gas (commonly helium) passing continuously through the column. Under the analysis conditions, the various components of the sample are selectively adsorbed and then selectively desorbed by the continuing stream of carrier gas. The various gaseous components pass from the column sequentially in order that their presence and relative concentration can be detected by appropriate sensing means in a detection apparatus. The sensing devices typically detect the nature and quantity of components in the sample according to their characteristic properties, such as thermal conductivity, density, refractive index, infrared absorption, etc.

The dynamic sampling of fluids for detection purposes to obtain quantitative results as well as qualitative analysis is particularly difficult when the velocity of the source relative to the sampling apparatus and the relationship of the sample pressure within the analyzing apparatus relative to the sample pressure at the source are unknown. The qualitative analysis of a sample can be completed without taking these unknown relationships into account. However, the quantitative determination necessary in a comparison of successive samples to determine the relative percentage occurrence of particular components in the samples requires that these values be measured independently of the sampling procedure or that the sampling procedure itself be carried out in a manner to provide such a relationship between successive tests in order that such measurements can be ignored in comparing successive test results. It is the latter course that is chosen in the disclosure set out herein.

The sampling of atmospheric gases, particularly with respect to air pollution control, analysis, and detection, requires the availability of a quantitative analyzing method that can be effectively carried out in a relatively short duration of time, preferably in a moving vehicle, such as an automobile or airplane. Successive test results must be readily related to one another for comparison of results obtained at different locations and for comparison of results obtained at a single location at different times.

One method of comparing such results quantitatively is to collect a fixed volume sample of gas, record the pressure and temperature of the sample prior to detection and analysis and then correlate the test results on the basis of such measurements. This involves considerable mathematical effort and introduces several measurements and possible sources of error into the comparative results.

Another method of providing a consistent relationship between the sample being tested and the sample source conditions is to balance the velocity of fluid entering the sampling system and the velocity of the sample source, as set out in U.S. Patent No. 2,452,224. However, such a system is impractical in atmospheric sampling methods, because the velocity and direction of movement of the source will vary from one instant to another and from one location to another and cannot be readily measured with accuracy, as is possible in the case of a confined stream of fluid. Another prior patent relating to the problem of balancing a sample of gas or fluid to a fluctuating source is Patent No. 2,726,548. However, it is concerned with a device for continuously removing a proportional amount of gas and is not particularly adapted to a sampling system using constant volume slugs of gas introduced into a detection system.

The method and apparatus described herein provides an effective manner of relating successive sample of atmospheric gases or other dynamic fluids to one another without requiring absolute measurement of the relative velocity between the testing and sampling apparatus and the source of fluid. Each sample, prior to detection of its components, is balanced with the static pressure of the fluid source.

It is a first object of this invention to provide a relatively simple method of correlating test results obtained from atmospheric samples by balancing the pressure of each sample prior to analysis, so that the test results can be correlated to one another in a direct manner.

Another object of this invention is to provide a unique combination of devices to permit immediate and accurate balancing of the sample pressure with the static pressure at the source from which it is taken.

Another object of the invention is to provide an apparatus that is particularly suited to the testing of atmospheric samples from a moving vehicle.

Another object of the invention is to provide a method and apparatus for permitting one to place a sample in static balance with the source from which the sample is taken, while eliminating contamination of the sample during the balancing operation.

These and further objects will be evident from the following disclosure, taken also with the accompanying drawings. The schematic elements of the drawing are generally common components available today, and this disclosure is concerned primarily with the method of sampling from a dynamic source using such components and the general arrangement of the apparatus and combination of components.

Summary of the invention

This invention basically comprises a method for analyzing a sample of fluid (liquid or gaseous) by use of a moving sampling and detection apparatus. The method includes the steps of collecting a sample of the fluid from the source at an uncontrolled pressure and subsequently equalizing the sample pressure with the static pressure of the fluid source prior to the analyzing steps. The method is carried out by use of a Pitot-static tube, its Pitot tube being used for collecting the sample and the static tube being used for pressure equalization. The apparatus also includes a differential pressure indicator utilized in the connection between the sample valve and the static tube for indicating the desired balance between the static pressure at the source of fluid and the pressure in the sample receiving element prior to analysis.

Description of the drawing

FIG. 3 is a schematic view of the apparatus utilizing a gas chromatograph.

Description of the preferred embodiment

Figure 1:
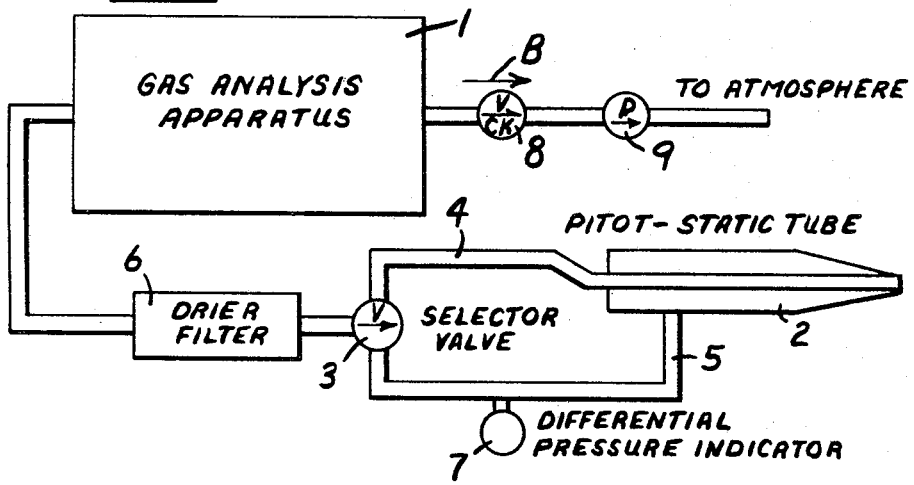
FIG. 1 is a schematic view of the general apparatus arrangement.

The components illustrated in the drawings are each conventional components available individually in analytical equipment presently on the market and in other equipment described below. The drawings illustrate only the fluid handling equipment and does not illustrate operating control devices and electronic indicating devices used conventionally to indicate the characteristic properties of the gaseous samples. Such indicating devices are conventionally used with the detecting devices shown. Their utilization and operation are well known and will be readily understood by those skilled in the art.

In proposing the use of conventional gas analytical apparatus for atmospheric sampling in a mobile vehicle, difficulty arises due to the many unknown relationships that can exist between the sample analyzed during each sampling operation. Because the atmospheric samples are a gas, their concentration and density will vary depending upon the pressure, temperature, altitude and velocity conditions. To relate all of these variables mathematically requires considerable effort and introduces many possibilities of error. According to the present method, this necessary relationship between successive testing procedures is provided by balancing the pressure of each sample volume with the static pressure of the atmospheric source from which the samples are taken. The test results can then be directly related to one another to correlate successive tests taken at the same atmospheric pressure, temperature and altitude. The instant method eliminates variability in the test due to velocity conditions, since the samples are balanced to static pressure prior to analysis.

The general arrangement of the instant apparatus is shown in FIG. 1. It is applicable to a variety of devices for gaseous analysis. The gas analysis apparatus is generally designated in FIG. 1 by the numeral 1. The apparatus 1 must be of a type that is used intermittently to analyze a fixed volume sample of the gas being tested. As will be evident, the present apparatus is not applicable to continuous analysis devices.

The atmospheric sample is received through a Pitot-static tube shown generally as 2, having a Pitot connection 4 and static connection 5. The pressure of the atmospheric gas within the Pitot connection 4 is dependent upon the dynamic pressure of the atmosphere at the point of sampling, while the pressure within the static connection 5 is equal to the static pressure at the same position.

The two connections 4, 5 are alternately directed to the gas analysis apparatus 1 through a suitable dryer and filter 6 and a selector valve 3. The static connection 5 is in communication with a differential pressure indicator 7 interposed between the Pitot-static tube 2 and the selector valve 3 in the static connection 5. The indicator 7 is preferably a very delicate pressure responsive mechanism, such as a vertical air speed indicator conventionally utilized in air craft instrumentation.

The gaseous sample is drawn through the apparatus 1 by a vacuum pump 9 having a check valve 8 interposed between the pump 9 and the gas analysis apparatus 1. The check valve 8 is such as to prevent the flow of gas from the pump 9 back into the system, including the apparatus 1. The valve 8 is typically set to open and permit the flow of fluid in the direction indicated by the arrow B at a pressure differential of ½ pound. It positively prevents external contaminations of the fluid system including the apparatus shown generally at 1, so that the gaseous sample being analyzed is composed solely of atmospheric air and gas entering the system at the Pitot-static tube 2.

In operation, the pump 9 is utilized to assist in drawing a gaseous sample from the Pitot connection 4 through the selector valve 3 and into the gas analysis apparatus 1. Pump 9 is used to purge prior samples and to refill the sample volume required within apparatus 1 in the shortest possible time. When the sample has been received, operation of pump 9 is terminated and the selector valve 3 is then shifted to place the apparatus 1 in communication with the static connection 5. The indicator 7 is utilized to indicate a balance achieved when the pressure within the sample volume of the gas analysis apparatus 1 is equal to the static pressure at the Pitot-static tube 2. When this equalization has been achieved, the apparatus 1 is utilized in the conventional manner to carry out the desired quantitative and qualitative analyses of the sample volume.

First embodiment

Figure 2:
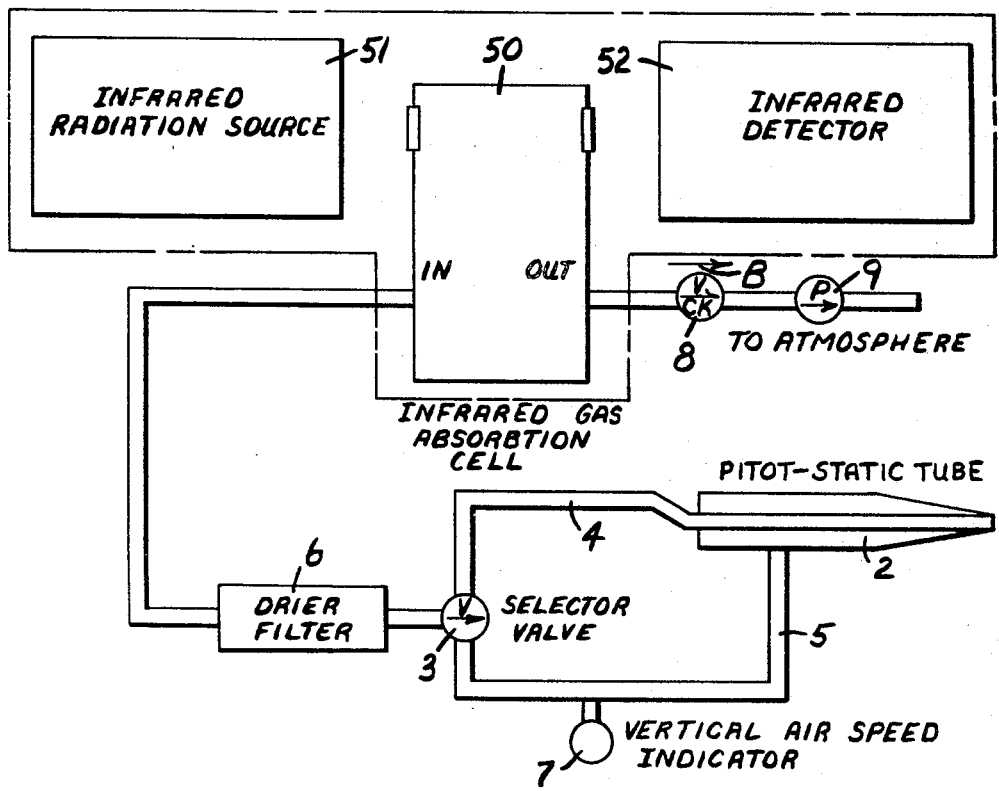
FIG. 2 is a schematic view of the apparatus utilizing an infrared spectrophotometer.

The first specific embodiment of the basic structure is illustrated in FIG. 2. In this embodiment, the gas analysis apparatus is a conventional infrared spectrophotometer. This unit includes a conventional infrared gas adsorption cell 50, an infrared radiation source 51 and an infrared detector 52. The previously described components discussed with respect to FIG. 1 are designated in FIG. 2 by identical reference numerals.

In use, the cell 50 is purged and filled with sample atmosphere from the pitot connection 4 through valve 3, during operation of the vacuum pump 9. When the pump is stopped, the selector valve 3 is operated, either manually or automatically, to equalize the pressure within the cell 50 to the static pressure in the static connection 5. Equalization is indicated, again either visually or automatically, by the pressure differential indicator 7. When the sample volume of atmosphere within cell 50 has been equalized with static pressure, the analysis of the gas can be carried out using conventional methods. By noting the exterior temperature, altitude and atmospheric pressure, subsequent tests in the area can be related to one another quantitatively as well as qualitatively, without taking into effect velocity and wind conditions.

Second embodiment

The apparatus shown schematically in FIGURE 3 includes a chromatographic analyzer shown within the broken lines indicated by the letter A. This analyzer includes two detectors. The detector 10 at the upper portion of the drawing is shown as being a hot wire bridge detector. It has two inlet connections at 11 and 12 which are provided with fluid from a conventional receiver 13 connected to the respective outlets of separating columns 14 and 15. The inlet of each column 14, 15 is connected to an injector 16 which serves as one support for the column and permits the chromatographic apparatus to be used for other types of sampling using conventional injection of the fluid at the injectors 16. The "splitters" conventionally provided in receiver 13 are plugged so that the output of each column 14, 15 passes straight through the receiver in a single path to the respective inlets 11 and 12 of detector 10.

The second detector 17 is a flame ionization detector provided with conventional connections for hydrogen gas from lines 18 and air from line 20. It is vented at 21 in the normal manner. Detector 17 also has two inlets 22, 23, connected to the output connections of a dual receiver 24. The receiver 24 supports and is in communication with the respective outlets of two additional separating columns 25 and 26. Their inlet connections are also supported by and connected to injectors designated by the numeral 27. The "splitters" in receiver 24 are also plugged so that the path of fluid from each column is straight through the receiver to the respective flame jets.

The inlet connections of the three upper injectors in the drawing are respectively connected to an outlet connection of a sample valve 28, 29 or 30. This outlet connection is designated in each instance by the numeral 31. The outlet connections 31 are parallel to each other in the fluid circuit. Each valve also has an alternate outlet connection designated at 32, by which the three valves are connected in series. Thus, the outlet connection 32 for valve 29 serves as one inlet connection for valve 28, and the outlet connection 32 for valve 30 serves as one inlet connection for valve 29. The corresponding input line for valve 30 is separately designated by numeral 33.

The conventional sampling valves 28, 29 and 30 are each provided with a sample loop 34. The volume within each sample loop 34 is closely regulated and provides a constant volume reference for the sample slugs of fluid analyzed by the apparatus.

Each sampling valve 28, 29 and 30 has a second inlet connection at 35 connected by means of a flow control valve 36 through a source of carrier gas shown generally at 37. The source of carrier gas 37 is also directly connected through a similar flow control valve 36 at the lower portion of the drawing to the lower injector 27, the lower separating column 26 being used as a reference column and not being provided with a sampling valve. The inlet connections 35 are parallel to one another.

Each sampling valve 28, 29 and 30 has two positions. In the first position, there is a direct connection from line 35 to line 31 so that carrier gas from source 37 passes through the valve directly to the column associated with it. In this first position of the sampling valve, the connecting lines 32 are placed in series with the respective loops 34 so that sample gas from line 33 must flow through each valve 28, 29 or 30, and the length of the loop 34 associated therewith before passing along lines 32 to the next valve.

In the second position of each valve 28, 29 or 30, the lines 32 and 33 are placed in direct communication with one another, bypassing loops 34. The lines 35 are placed in series with each loop 34 and the associated line 31, so that carrier gas from the source 37 passes first through the respective loops 34 and then is supplied to the respective lines 31 and the separating columns.

The apparatus just described is a modification of existing equipment and components. Each component is conventional in chromatographic equipment, the modifications being concerned with the manner in which they are connected to one another. The apparatus is used for analysis purposes in a manner that is basically conventional. Fluid (gas) is continually passed through each of the four separating columns. During most of the operating time, this fluid will be the carrier gas from source 37, typically helium. Columns 14 and 15 are always operated alternately, since one must be supplied with the carrier gas so as to balance the instrumentation used to analyze the sample slug being passed through the other. As an example of the choice of separating columns, column 14 can be designed to separate successively the components of oxygen, nitrogen and carbon monoxide and column 15 might be used to separate either carbon dioxide or nitrogen dioxide.

The lower two columns 25, 26 in the drawing are used for flame ionization detection of hydrocarbons. Column 26 is used always as a reference column, being provided with a constant supply of carrier gas from the source 37. It is used as a balance for the detection signal provided from the outlet of column 25. As an example, the column 25 might separate hydrocarbons containing one through six carbon atoms or containing one through twelve carbon atoms. The detection of such compounds is achieved from the operation of detector 17 in the conventional fashion, using electronic detection and recording equipment 48 well known in this type of apparatus.

The apparatus by which pressure equalization of each sample is achieved includes a pitot-static tube 40, such as the pitot-static tube used on aircraft for instrumentation purposes. Such a pitot-static tube is sometimes used on aircraft with the pitot tube being used for air speed and the static tube being utilized to indicate the rate of climb, altitude and absolute pressure. The pitot-static tube 40 includes a pitot connection 41 and static connection 42, each open to the atmospheric source at closely proximate positions on the vehicle on which it is mounted. The pitot connection 41 contains sample gas at a pressure proportional to the relative velocity between the atmospheric source and pitot-static tube 40. The static connection 42 contains sample gas at a pressure equal to the static pressure of the atmospheric source.

A selector valve 43 is interposed between the connections 41, 42 of the pitot-static tube 40 and the inlet line 33 to the first sampling valve 30 in the series of three sampling valves shown. Valve 43 has two positions, the first connecting the pitot connection 41 to line 33 and the second connecting the static connection 42 to the line 33. Line 33 is alternately connected to one or the other of the connections 41, 42, only one inlet to the valve 43 being operative at a given position. As shown, line 33 is provided with a conventional dryer and filter 44. In addition, the static connection 42 includes a differential pressure indicator 45. The indicator 45 is preferably a very delicate pressure mechanism, such as a vertical air speed indicator conventionally utilized in aircraft instrumentation.

The final line 32 connected to sampling valve 28 is connected to a vacuum pump 46 by means of a check valve 47, which positively prevents external contamination of the system including sampling valves 28, 29 and 30 as described above.

The sampling apparatus just disclosed cooperates with the analysis apparatus to provide accurate correlation between successive sampling operations. The entire apparatus is preferably mounted on a movable vehicle such as a truck or aircraft. The moving vehicle collects the atmospheric samples through the pitot connections 41 of the pitot-static tube 40. The valve 43 is first set to connect the pitot connection 41 to line 33. Failure to connect line 41 to 33 prior to turning on the vacuum pump will result in damage to the differential pressure indicator. With sample loops 34, on valves 28, 29 and 30, in series with lines 35 and 31, turn on the vacuum pump. This rapidly evacuates the old sample in lines 33 and 32. Sampling valves 30, 29 and 28 are then operated successively to place the loops 34 in series with lines 33, 32. The lines 33, 32 and loops 34 will therefore be flushed in succession. During collection of the sample the vacuum pump 46 is operated to pull the sample atmosphere through the system in the shortest time practical.

When the collecting system, including loops 34, has been purged of gases previously introduced into it, pump 46 is stopped, and valve 47 will prevent the reverse flow of fluid into the system, which normally will be at a pressure less than atmospheric. Selector valve 43 is then shifted to its second position, placing the lines 33, 32 and loops 34 in open communication with the static connection 42 of the pitot-static tube 40. At this time, the pressure in the sampling system will be equalized with the static pressure at the pitot-static tube 40 in the atmospheric source, this equalization being indicated by the indicator 45. When using a vertical airspeed indicator, a zero reading on indicator 45 will show the operator that the apparatus has been equalized with static pressure. The sampling valves 28, 29 and 30 can then be shifted to their second positions to interject the equalized sample slugs through the respective sampling columns and detectors. In operation, the columns 14 and 25 can be operated simultaneously and column 15 can be operated at a suitable elapsed time, depending on the parameters of the system (oven temperature, carrier flow rate, column packing, etc.), so that the elute of column 15 does not interfere with the elute of column 14. This permits the same electronic recording equipment to be used for the two similar columns 14 and 15.

General discussion

The basic method with which this disclosure is concerned involves the reception of a sample by use of the pitot connection of the pitot-static tube, the pressure of the sample being initially uncontrolled in order that it can be received quickly by use of the vacuum pump. Each sample is then equalized with static pressure at the pitot-static tube following termination of operation of the vacuum pump. During equalization of pressure, the sample gas is confined within the fixed-volume system. At the time of sample taking, the operator must record atmospheric pressure at the location of the pitot-static tube, the temperature of the atmosphere about the pitot-static tube and the altitude of the equipment, preferably both by barometric and radio altimeter. These readings can then be used to correlate data taken at different pressures, temperature and altitude. The velocity and direction of movement of the pitot-static tube relative to the sample source has no bearing on the test results, because of the pressure equalization step.

The apparatus described has been developed to utilize available components in the novel combination including the present sampling apparatus. Obviously, modifications can be made in the particular components to better facilitate their use in this apparatus, rather than in the conventional equipment for which they were designed. The steps described for manual operation can also be performed automatically by the use of solenoid operated valves and a sequential control to operate the pump and valves, the controls further being developed so as to be dependent upon the correct balance being achieved at the differential pressure indicator. The development of such automatic controls is believed to be a logical result of this description of the manually controlled system.

One of the advantages of this apparatus is that it does not require a particular limit or range of pressure within the system prior to equalization with the static pressure. The sampling system, prior to equalization, can either be below atmospheric pressure or above atmospheric pressure. All that is important is that prior to analysis, the pressure within the sampling system can be equalized with the static pressure at the pitot-static tube. The sample is then analyzed and the results can be quantitatively related as well as being used for qualitative analysis.

Having thus described my invention, I claim:

1. In an atmospheric sample analyzer comprising:
   a gas analysis apparatus including a detector for indicating characteristic properties of a fixed volume sample of gas;
   a source of atmospheric sample to be analyzed;
   a fluid sampling apparatus, comprising;
      a pitot-static tube having a pitot connection and a static connection in communication with a source of dynamic atmospheric samples at locations proximate to one another;
      and selector valve means operatively interposed between said pitot-static tube and said gas analysis apparatus for successively connecting the pitot connection and the static connection to the gas analysis apparatus to provide a sample therein having a pressure equalized with respect to the pressure within said static connection.

2. The apparatus as set out in claim 1 further comprising:
   differential pressure detection means operatively connected to said gas analysis apparatus and said static connection for detecting equalization of pressure between the sample and atmospheric gases within the static tube.

3. The apparatus as set out in claim 1 wherein said gas analysis apparatus includes a receiving chamber for the sample prior to analysis;
   and a source of vacuum pressure connected to said gas analysis apparatus at the side thereof opposite to said selector valve to selectively draw gas through said gas analysis apparatus and receiving chamber thereof.

4. In an atmospheric sample analyzer comprising:
   a gas analysis apparatus including a detector for indicating characteristic properties of a fixed volume sample of gas;
   a source of carrier gas;
   a source of atmospheric sample to be analyzed; and
   a sample valve to pass carrier gas to the gas analysis apparatus and to interrupt the flow of carrier gas periodically and inject a slug of sample into the carrier gas passing to the apparatus, the combination therewith of:
      a fluid sampling apparatus, comprising:
         a pitot-static tube having a pitot tube and a static tube in communication with a source of dynamic atmospheric samples at locations proximate to one another;
         and selector valve means operatively interposed between said pitot-static tube and sample valve for successively connecting the pitot tube and static tube to the sample valve to provide a sample having the pressure thereof equalized with respect to the pressure within said static tube.

5. The apparatus as set out in claim 4 further comprising:
   differential pressure detection means operatively connected to the sample valve and said static tube for detecting equalization of pressure between the sample and atmospheric gas within the static tube.

6. The apparatus as set out in claim 4 wherein said sample valve includes a receiving chamber for the sample prior to analysis;
   and a source of vacuum pressure connected to said sample valve at the side thereof opposite to said selector valve to selectively draw gas through said sample valve and receiving chamber.

7. The apparatus as set out in claim 4 wherein said sample valve includes a storage loop for accumulation of the sample prior to the injection thereof into the carrier fluid;
   a source of vacuum pressure connected to said sample valve at the side thereof opposite to said selector valve to draw fluid through said sample valve and storage loop thereof;

and check valve means operatively interposed between said source of vacuum pressure and said sample valve for preventing flow of gas from said source of vacuum pressure to said sample valve.

8. The apparatus as set out in claim 4 further comprising:
a differential fluid pressure indicator operatively interposed between the selector valve means and the static tube.

9. In a chromatographic analyzer apparatus for an atmospheric sample source moving relative to the apparatus, comprising:
a separation column including an inlet for receiving a gaseous sample and an outlet for sequentially discharging separated components thereof;
a detection apparatus connected to the outlet of said separation column;
a sample storage means for receiving a constant volume of a gaseous sample;
sample valve means having an inlet connection for receiving gaseous samples and an outlet connection in communication with the inlet of said separation column, said sample valve means being operably connected to said sample storage means for alternately placing said sample storage means in communication with said inlet connection and said outlet connection;
and carrier gas means operatively connected to said sample valve means for directing carrier gas to said sample storage means when said sample valve means is actuated to place said sample storage means in communication with said outlet connection;
the improvement comprising:
a pitot-static tube positioned within the atmospheric sample source including a pitot tube and static tube in adjacent open communication with the atmospheric sample source;
and selector valve means operatively interposed between said pitot-static tube and said inlet connection of said sample valve means for alternately placing the pitot tube and the static tube in communication with said inlet connection.

10. The apparatus as set out in claim 9 further comprising:
differential pressure detection means operatively connected to the static tube and said sample valve means for detecting equalization of pressure between fluid within the sample storage means and fluid within said static tube.

11. The apparatus as set out in claim 9 further comprising:
a source of vacuum pressure connected to said sample valve means at the side thereof operatively opposite to its connection to said selector valve means to selectively draw fluid through said sample storage means.

12. The apparatus as set out in claim 9 further comprising:

a source of vacuum pressure connected to said sample valve means at the side thereof operatively opposite to its connection to said selector valve means to selectively draw fluid through said sample storage means;
and check valve means operatively interposed between said source of vacuum pressure and said sample valve means for preventing flow of fluid from said source of vacuum pressure to said sample valve means.

13. In the method of analyzing atmospheric samples which comprises placing a fixed volume sample of atmospheric gas in a gas analysis apparatus, the improvement comprising:
collecting a sample of atmospheric gas from a pitot connection of a pitot-static tube located in a dynamic fluid source;
and equalizing the pressure of the collected sample by placing the fluid sample in communication with the static connection of the pitot-static tube.

14. In the method of analyzing a fluid stream which comprises passing a carrier fluid through a chromatographic column, intermittently passing a sample of fluid to be analyzed through said column and then passing the effluent of the column through a detecting means to detect and identify components of said effluent, the improvement comprising:
collecting a sample from a fluid source at an uncontrolled pressure by receiving the sample within a fixed-volume storage device from a pitot-static tube located in a dynamic fluid source;
and equalizing the pressure of the sample relative to the static pressure at the fluid source by placing the sample in open communication with the fluid source at static pressure prior to passing the sample through said column, the equalizing of pressure being carried out by placing the fluid sample within the storage device in communication with the static connection of the pitot-static tube.

15. The method as set out in claim 14 wherein the sample is collected by application of vacuum pressure, and wherein application of vacuum pressure is terminated prior to equalizing the pressure of the sample.

References Cited

UNITED STATES PATENTS

| | | | |
|---|---|---|---|
| 1,057,631 | 4/1913 | Fowler | 73—212 |
| 2,964,938 | 12/1960 | Fuller | 73—23 |
| 3,032,953 | 5/1962 | Micheletti. | |
| 3,321,976 | 5/1967 | Jones | 73—421.5 |
| 3,338,087 | 8/1967 | Moberg et al. | 73—421.5 XR |
| 3,382,721 | 5/1968 | Tinkham et al. | 73—421.5 |

LOUIS R. PRINCE, Primary Examiner

HARRY C. POST III, Assistant Examiner

U.S. Cl. X.R.

73—23, 421.5, 422